United States Patent Office 3,150,077
Patented Sept. 22, 1964

3,150,077
METHOD OF TREATING LUBRICATING OIL
Edward L. Cole, Glenham, and Gordon H. Miller, Poughkeepsie, N.Y., assignors to Texaco Inc., New York, N.Y., a corporation of Delaware
No Drawing. Filed Jan. 25, 1961, Ser. No. 84,746
6 Claims. (Cl. 208—264)

This invention relates to improvements in the manufacture of lubricating oils. More particularly it concerns a process in which a hydrocarbon lubricating oil is treated with hydrogen in the presence of an irradiated hydrogenation catalyst to produce a lubricating oil product of improved viscosity index and color.

Lubricating oils are conventionally refined by methods including the steps of distillation, solvent refining, acid treating, clay contacting and solvent dewaxing. When residual type lubricating oils are processed an additional step of deasphalting is usually required. In the processing steps listed above distillation is employed as a means of separating the crude oil into fractions of various viscosities. Solvent refining with, for example, furfural, sulphur dioxide or phenol, is ordinarily used as a means of removing aromatic compounds and thereby improving viscosity index of the treated oil. Viscosity index is an important characteristic and is a measure of the resistance of the oil to change in viscosity with change in temperature. Acid treating is employed to improve the color stability and resistance to oxidation of the lubricating oils. Clay contacting is used to further improve the color and to neutralize the oil after acid treating. Deasphalting is employed to remove asphaltic bodies and solvent dewaxing is used to lower the pour point of the oil.

Catalytic hydrogenation of lubricating oil is known in the prior art as a means of refining an oil with hydrogen for the improvement of its viscosity index and color. This method of refining lubricating oils with hydrogen in the presence of catalyst has the advantage over solvent refining to improve viscosity index and over clay treating to improve color in that the yields of treated oil are much higher for the hydrogenation process. The hydrogenation process is also designated in the prior art by the terms "hydrorefining" and "hydrofinishing." Hydrorefining is a more severe hydrogen treating process than hydrofinishing and is normally employed to improve both the viscosity index and color characteristics of the oil, i.e., provide an oil of a lighter color and with a viscosity less susceptible to temperature changes. Hydrofinishing being a milder hydrogenation than hydrorefining, although having some improving effect on viscosity index, does not substantially change the viscosity index of the oil but does materially improve the color thereof. Hydrofinishing is employed when complete removal or destruction of the anticorrosive sulfur bodies in the lubricating oil is not desired. Hydrorefining tends to decompose and remove the sulfur bodies from the lube.

Hydrorefining may be carried out employing a wide range of operating conditions and catalysts. For example, temperatures of about 600 to 800° F., pressures about 500 to 10,000 p.s.i.g., space velocities of about 0.1 to 5.0 volumes of oil/volume of catalyst/hr. and a hydrogen: charge lube oil ratio of between about 1000 and 20,000 cu. ft./barrel may be used. Preferred conditions comprise temperatures of 625 to 750° F., pressures of about 3000 p.s.i.g., space velocities of about 0.5 to 2.0 and between about 4000 and 10,000 cu. ft. $H_2$/barrel charge lube oil. The amount of hydrogen consumed under the broad and preferred conditions of hydrorefining is between about 300–3000 and 500–1700 cu. ft. $H_2$/barrel charge stock, respectively.

Hydrogenation catalysts comprising metals of the 6th and 8th groups of the periodic table, their oxides, sulfides, or mixtures thereof may be employed in the hydrorefining operation. Nickel sulfide-tungsten sulfide catalyst having a composition represented by the formula $$NiS \cdot 0.75WS_2$$

and cobalt molybdate are particularly suitable for the process of this invention.

As heretofore stated the hydrofinishing process is conducted under somewhat milder conditions than employed in hydrorefining. Temperatures and pressures are about 400 to 650° F. (500–600° F. preferred) and about 300 to 1000 p.s.i.g. (500–800 p.s.i.g. preferred), respectively. The hydrogen:charge oil ratio employed is between about 1000 and 10,000 cu. ft./barrel (preferably 2000–5000 cu. ft./barrel) and the space velocity utilized is essentially the same as in hydrorefining. The hydrogen consumed under the broad and preferred conditions is between about 25–1000 and 50–350 cu. ft. $H_2$/barrel charge oil. Hydrogenation catalysts suitable for use in the hydrorefining step are satisfactory for hydrofinishing. However, the preferred catalyst in hydrofinishing are platinized charcoal, cobalt molybdate on alumina, cobalt-nickel molybdate on alumnia, molybdenum oxides and/or sulfides on alumina and composite catalysts comprising aluminum, platinum and combined halogen.

We have found and this constitutes our invention that hydrogenation catalysts of the types previously described which have been irradiated with ionizing radiations such as gamma, alpha or beta rays, neutrons, fission recoils, or accelerated ions permit the aforementioned hydrotreating processes to produce lubricating oils of a significantly higher viscosity index and/or lighter color than when non-irridated catalysts are employed. More particularly, we have found that hydrogenation catalysts which absorb a radiation dosage of at least about $1 \times 10^7$ rads (100 ergs/gram), preferably between about $0.5 \times 10^8$ and $2 \times 10^8$ rads, give a significant increase in viscosity index and imparts better color properties to the oil. Absorbed radiation dosages below about $1 \times 10^7$ rads do not significantly affect the catalyst activity and dosages above $2 \times 10^8$ rads are generally unwarranted from the standpoint of further increased catalytic activity.

The catalyst can be irradiated prior to introduction into the hydrotreating system. Alternatively portions of the catalyst while in use can be continuously withdrawn from the reactor, irradiated and then recycled to the reactor. The latter method insures a continuous level of activity for the catalyst. One preferred source of ionizing radiation is a gamma ray emitting source such as gamma ray emitting radio isotopes or fission products such as cobalt 60. The hydrogenation catalyst employed can exist as discrete particles of small size such as under 1000 microns or can exist as aggregates such as beads, pellets or other types of compactations having sizes up to 1" or more.

The reason why the irradiation of the hydrogenation catalyst contemplated herein significantly improves viscosity index and color of lubricating oils is not thoroughly understood. However, it is believed the ionizing radiations contemplated herein somehow affect the crystal structure of the catalyst in a manner to make it more active in respect to viscosity and color in the hydrorefining and hydrofinishing processes of the type contemplated herein.

Examples of lubricating oils contemplated for processing by our inventive process are petroleum fractions having a viscosity of between about 50 and 1500 SUS at 210° F., preferably between about 100 and 750 SUS at 210° F.

The following example illustrates ways in which the principle of the invention has been applied but is not to be construed as limiting its scope.

EXAMPLE I

The catalysts employed in the following runs were irradiated by placing them into 150 ml. tubes of 41 mm. standard Pyrex approximately 5½" long with reduction on each end to 10 mm. tubing for loading, purging and sealing. The catalysts were purged of air by a stream of nitrogen for 1.5 to 2 hours at room temperature. The tubings were closed off by rubber tubing and pinch clamps and then flame sealed. The tubes were placed in a sample holder in a reproducible position so that their geometry within the gamma emitting source was known. The irradiation of the catalyst was carried out with a cobalt 60 source. The radioactive cobalt is contained in 156 stainless steel pencils each having a nominal size of ½" diameter by 10" long (active portion). The pencils are arranged vertically in a double row holder so that they form an open cylinder 2' in diameter and 10" high. The sealed tubes of catalyst in the sample holder were placed in the cylinder formed by the cobalt-containing stainless steel pencils and holder therefor. After irradiation the tubes were opened and the catalyst was put in the hydrogenation unit reactor for evaluation.

In the operation of the hydrotreating process hydrogen and a liquefied lubricating oil stock are separately introduced into the hydrogen treating system and combined. The mixture of lube oil stock and hydrogen are then introduced into a preheater which consists of 16 foot length of $\%_{16}$" O.D. super pressure tubing helically wound in a 3" coil. This helical loop is encased in an insulated jacket and heated by a fixed and a variable heater. The preheated mixture of lube oil stock and hydrogen is then introduced into a 500 milliliter stainless steel reactor packed with pellets of irradiated catalyst. After passage of the mixture through the reactor the reaction mixture is sent on to a gas separator where the unconsumed hydrogen and by-product gases are withdrawn from the top of the separator and the hydrogen treated lube oil is withdrawn from the bottom. The hydrogen treated oil is dewaxed by agitating 1.0 volume of oil with 3.0 volumes of a dewaxing solvent at 110° F., said solvent consisting of 40 volume percent methyl ethyl ketone and 60 volume percent of benzol. The resultant mixture was cooled to −12° F. The cooled mix was then filtered on a cloth covered filter and the resulting wax cake was washed with additional portions of said solvent. The resultant washings were combined with the filtrate containing the wax free hydrogen treated oil. The solvent was distilled from the filtrate leaving the hydrogen treated wax free oil as residue.

The lubricating oils employed in the above method had the following properties:

| Description | Stock A | Stock B |
|---|---|---|
| Gravity, ° API | 25.1 | 30.2 |
| Flash, COC, ° F | 450 | 440 |
| Fire, COC, ° F | 515 | 515 |
| Kin. Vis. at 210° F | 9.14 | 7.78 |
| SUS Vis. at 210° F | 56.4 | 51.7 |
| Pour, ° F | 105 | 105 |
| Color, ASTM | (1) | 8 |
| Carbon Residue, Wt. percent | 0.16 | 0.02 |
| Sulphur, Bomb, Wt percent | 0.33 | 0.14 |

[1] Too dark for test.

The catalysts employed in the above procedure were (1) ⅛" pellets of cobalt molybdate impregnated on an alumina carrier, (2) ¼" pellets of unused nickel-tungsten-sulfide and (3) ¼" pellets of nickel-tungsten-sulfide which had been used for an estimated 1000 hours in the hydrorefining of various lubricating oils. Analysis of these catalysts is as follows:

| Analysis Wt. Percent | Used NiWS | New NiWS | Cobalt Molybdate |
|---|---|---|---|
| Nickel | 19 | 18 | |
| Tungsten | 43 | 46 | |
| Sulfur | 26 | 26 | |
| Carbon | [1] 10 | [2] 10 | [2] 1.6 |
| Volatiles (H$_2$O, etc.) | 2 | | |
| CoO | | | 2.8 |
| MoO$_3$ | | | 9.7 |
| Al$_2$O$_3$ | | | 85.9 |

[1] Carbon deposited from previous hydrorefining operations.
[2] Carbon added.

The test data and results are reported below in Tables I, II and III. Tables I and II relate to the treatment of Stock A with used and new nickel tungsten sulfide catalyst under hydrorefining conditions. Table III pertains to the color improvement of Stock B utilizing a cobalt molybdate catalyst impregnated on alumina under hydrofinishing conditions.

*Table I*

HYDROREFINING STOCK "A" WITH USED IRRADIATED NICKEL TUNGSTEN SULFIDE CATALYST

| Process Ingredients and Conditions: | | |
|---|---|---|
| Catalyst: | | |
| Amount, grams | 297 | 283 |
| Absorbed Dose, Rads | None | 1.26×10$^8$ |
| Process Conditions: | | |
| Preheater Temp., ° F | 455 | 455 |
| Reactor Temp., ° F | 676 | 680 |
| Hydrogen: Stock A Ratio, cu. ft./bbl | 10,000 | 10,000 |
| Hydrogen Consumption, cu. ft. H$_2$/bbl. of Stock A | 520 | 550 |
| Reactor pressure, p.s.i.g | 4,000 | 4,000 |
| Liquid space velocity, v./v./hr | 0.83 | 0.89 |
| Dewaxed Product Oil: | | |
| Viscosity Index | 76 | 84 |
| Color, ASTM | 1 | <1 |

*Table II*

HYDROREFINING STOCK "A" WITH IRRADIATED NEW NICKEL TUNGSTEN SULFIDE CATALYST

| Process Ingredients and Conditions: | | |
|---|---|---|
| Catalyst: | | |
| Amount, grams | 272 | 250 |
| Absorbed Dose, Rads | None | 0.73×10$^8$ |
| Process Conditions: | | |
| Preheater Temp., ° F | 500 | 500 |
| Reactor Temp., ° F | 680 | 678 |
| Hydrogen: Stock A Ratio, cu. ft./bbl | 10,000 | 10,000 |
| Hydrogen Consumption, cu. ft. H$_2$/bbl. of Stock A | 540 | 575 |
| Reactor Pressure, p.s.i.g | 4,100 | 4,100 |
| Liquid Space Velocity, v./v./hr | 0.70 | .76 |
| Dewaxed Product Oil: | | |
| Viscosity Index | 80 | 85 |
| Color, ASTM | 1 | <1 |

*Table III*

HYDROFINISHING STOCK "B" WITH NEW IRRADIATED COBALT MOLYBDATE CATALYST

| Process Ingredients and Conditions: | | | | |
|---|---|---|---|---|
| Catalyst: | | | | |
| Amount, grams | 143 | 131 | 143 | 131 |
| Absorbed Dose, Rads | None | 0.79×10$^8$ | None | 0.79×10$^8$ |
| Process Conditions: | | | | |
| Preheater Temp., ° F | 451 | 453 | 451 | 453 |
| Reactor Temp., ° F | 575 | 575 | 600 | 600 |
| Hydrogen: Stock B Ratio, cu. ft./bbl | 2,500 | 2,500 | 2,500 | 2,500 |
| Hydrogen Consumption, cu. ft. H$_2$/bbl. of Stock B | 50 | 60 | 100 | 110 |
| Reactor pressure, p.s.i.g | 1,000 | 1,000 | 1,000 | 1,000 |
| Liquid Space Velocity, v. v. hr | 0.75 | 0.75 | 0.75 | 0.75 |
| Dewaxed Product Oil: Color, Lovibond 6" Cell | 85 | 75 | 45 | 30 |

As can be seen from the above tables the hydrogen treatment processes utilizing irradiated catalysts produced lubricating oils of significantly lower color and higher viscosity index than the comparative processes utilizing unirradiated catalyst. Surprisingly, this was true even in instances when the comparative process used more catalyst and lower space velocities.

All percentages hereinbefore and hereinafter recited are based on weight unless otherwise stated.

We claim:

1. A method of processing a hydrocarbon lubricating oil to enhance the quality thereof which comprises contacting said lubricating oil with hydrogen at a hydrogen:lubricating oil ratio of at least about 1000 cu. ft./bbl. and at an elevated temperature and pressure in the presence of a hydrogenation catalyst selected from the group consisting of oxides, sulfides and mixtures thereof of metals of Group VI and Group VIII of the Periodic Table, platinized charcoal, and halogenated aluminum-platinum mixture, said hydrogenation catalyst having been previously subjected to ionizing irradiation until said catalyst received an absorbed dosage of at least about $1 \times 10^7$ rads.

2. A method of processing a hydrocarbon lubricating oil to enhance the viscosity index and color properties thereof which comprises contacting said oil with hydrogen at a hydrogen:lubrication oil ratio of between about 1000 and 20,000 cu. ft./bbl. at a temperature between about 400 and 800° F., a pressure of between about 300 and 10,000 p.s.i.g. and a space velocity of between about 0.1 and 5 volumes of oil/volume of catalyst/hour in the presence of a previously irradiated hydrogenation catalyst selected from the group consisting of oxides, sulfides and mixtures thereof of the Group VI and Group VIII metals of the Periodic Table, platinized charcoal, and halogenated aluminum-platinum mixture, said catalyst having been irradiated with gamma rays until said catalyst received an absorbed dosage of between about $1 \times 10^7$ and $2 \times 10^8$ rads.

3. A method in accordance with claim 2 wherein said hydrogenation catalyst is nickel tungsten sulfide.

4. A method in accordance with claim 2 wherein said catalyst is cobalt molybdate impregnated on alumina.

5. A method of processing a hydrocarbon lubricating oil to enhance the viscosity index and color properties thereof which comprises contacting said oil with hydrogen at a hydrogen:lubricating oil stock ratio of between about 1000 and 20,000 cu. ft./bbl. of oil at a temperature between about 600 and 800° F., a pressure of between about 500 and 10,000 p.s.i.g. and a space velocity of between about 0.1 and 5 volumes of oil/volume of catalyst/hour in the presence of previously irradiated nickel tungsten sulfide catalyst, said catalyst having been irradiated with gamma rays from a cobalt 60 source until said catalyst received an absorbed dosage of between about $0.5 \times 10^8$ and $2 \times 10^8$ rads and subsequently dewaxing said oil.

6. A method of processing a hydrocarbon lubricating oil to enhance the color properties thereof which comprises contacting said oil with hydrogen at a hydrogen:lubricating oil stock ratio of between about 1000 and 10,000 cu. ft./bbl. of oil at a temperature between about 400 and 650° F., a pressure of between about 300 and 1000 p.s.i.g. and a space velocity of between about 0.1 and 5 volumes of oil/volume of catalyst/hour in the presence of cobalt molybdate on alumina, said catalyst having been previously irradiated with gamma rays from a cobalt 60 source until said catalyst received an absorbed dosage of between about $0.5 \times 10^8$ and $2 \times 10^8$ rads and subsequently dewaxing said oil.

References Cited in the file of this patent

UNITED STATES PATENTS

| 2,905,606 | Long et al. | Sept. 22, 1959 |
| 2,917,448 | Beuther et al. | Dec. 15, 1959 |
| 2,921,025 | Holm et al. | Jan. 12, 1960 |
| 2,953,509 | Ruskin | Sept. 20, 1960 |

OTHER REFERENCES

Bragg et al.: WADC Tech. Report No. 59–286.

Clarke et al.: "Nature," volume 180, pages 140–141, July 20, 1957.